United States Patent

Williams et al.

[15] 3,636,610

[45] Jan. 25, 1972

[54] WIRE PULL AND TAPE MACHINE

[72] Inventors: Sidney B. Williams, Cedarburg; Martin E. Baumann, West Bend, both of Wis.

[73] Assignee: Sprague Electric Company, North Adams, Mass.

[22] Filed: Jan. 29, 1970

[21] Appl. No.: 6,871

[52] U.S. Cl. ..........................29/203, 29/203 D, 29/203 MW

[51] Int. Cl. ..........................................................H05k 13/04

[58] Field of Search.....................29/203 B, 211, 203, 203 D, 29/203 MW

[56] References Cited

UNITED STATES PATENTS 2,987,804 6/1961 Nichol.....................................29/628

3,169,305 2/1965 Gray.....................................29/203 B

*Primary Examiner*—Thomas H. Eager

*Attorney*—Connolly and Hutz, Vincent H. Sweeney, James Paul O'Sullivan and David R. Thornton

[57] ABSTRACT

An automatic wire pull and tape machine which loads successive carrier strips onto an intermittently moving conveyor. A plurality of wires is pulled by gripping jaws into position over the carrier strip, the wires are taped to the carrier strip and cut to uniform length during a stationary period of the conveyor. Selected of the taped wires are offset by forming dies and all the wires are trimmed to a uniform length at another stationary period of the conveyor. The carrier strips are then moved from the conveyor to a receptacle.

5 Claims, 1 Drawing Figure

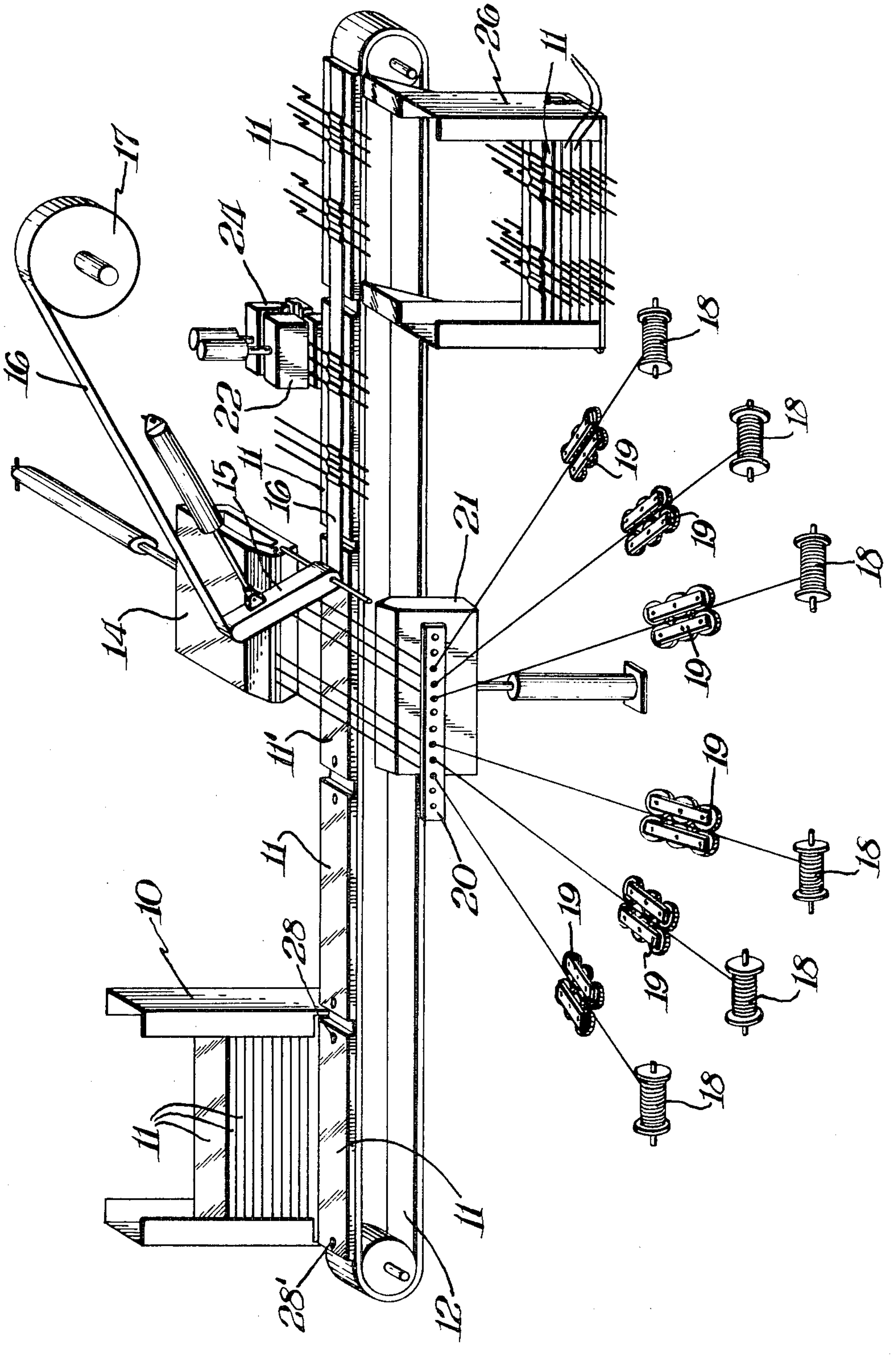

WIRE PULL AND TAPE MACHINE

BACKGROUND OF THE INVENTION

In general this invention relates to a wire pull and tape machine and more particularly to a wire pull and tape machine adapted for automatic operation whereby wire terminal leads are cut to uniform lengths and fastened to appropriate carrier strips in order to facilitate the production of printed circuit boards or ceramic disc capacitors. The wire tape and pull machine has the added capability of subsequently offsetting the ends of a predetermined number of terminal leads in the same repeating sequential pattern.

Recently there has been an increasing market for printed circuit boards and ceramic capacitors of the so-called disc type, due in part to their relatively small size and in part to their ready adaptability, when properly arranged, for use in conjunction with automatic assembly machinery for installation purposes. Conventional fabrication procedures for the manufacture of printed circuit boards and capacitors have been almost always discontinuous in nature involving relatively tedious and time-consuming hand operations which have limited production and contributed to the costs of the finished product. Machines have been used to facilitate the batch handling of subassemblies. In the batch process, the assembly and joining of components and the covering, testing and marking steps are carried out in batches of a definite number of units in which the component parts are attached to a carrier strip of some kind such as a cardboard strip or an adhesive tape. Normally the first step in any conventional fabrication procedure for the manufacture of printed circuit boards or ceramic disc capacitors is to attach parallel terminal wires of uniform length to a carrier strip.

One well-known machine for accomplishing this procedure is the so-called loom where a number of parallel wires are pulled over a carrier strip at the same time. The operator of the machine then tapes down the ends of the wires so as to fasten them in place on the carrier strip. A cutter is then actuated by the operator which cuts off the ends of the wires fastened to the carrier strip and the process is repeated for a new carrier strip. The so-called loom process requires the continuous attention of an operator and its many tedious and time-consuming hand operations limit production and materially increase the cost of the final product. Other equipment however has been devised which will automatically apply terminal wires to a carrier strip without the continuous attention of an operator. The operation of these machines however is normally slow due to the fact that their capabilities are limited to either fastening one terminal wire at a time or to fastening the so-called hairpin terminal wire which necessitates an additional cutting operation in order to have two separate terminal wires. Also these machines are normally limited to the production of ceramic disc capacitors in which the terminal wires would be uniformly spaced and they cannot be easily adapted for setting up the irregular lead spacing required for attachment to printed circuit boards.

Therefore it is an object of this invention to produce a machine capable of continuous automatic operation for assembling lead wires for printed circuit boards and capacitors on carrier strips on which such leads remain until all of the manufacturing operations and testing have been completed.

It is another object of this invention to produce a substantially automatic machine for taping lead wires of uniform length to appropriate carrier strips and offsetting the ends of a predetermined number of the lead wires in a subsequent stamping operation.

It is a further object of this invention to produce a machine capable of continuous automatic operation whereby the spacing between the wire leads may be conveniently set in any number of predetermined arrangements.

SUMMARY OF THE INVENTION

An automatic wire pull and tape machine designed to facilitate the production of printed circuit boards and ceramic disc capacitors by taping wire leads across appropriate carrier strips in order to better align and position them for subsequent soldering to their respective terminals on printed circuit boards or ceramic disc capacitors. Cardboard carrier strips commonly referred to as chipboards are automatically fed onto one end of a conveyor which moves the strips in a sequential manner periodically stopping to allow automatic programmed operations to be accomplished upon the chipboards. In the first operation upon the chipboard, programmed air actuated gripping jaws reach over the chipboard and grasp the ends of a given number of wires spaced at predetermined distances from each other by a comb. The gripping jaws then pull the wires across the chipboard with the wires being drawn from a series of spools and fed through a series of guides and straighteners.

After the wires are drawn over the chipboard, a programmed air actuated stamper presses tape to the top of the chipboard and wires so as to tape the wires in place on the chipboard with the tape being continuously fed from an overhanging spool. With the stamper actuated so as to hold the wires and tape in place, an air-actuated cutter severs the wires taped to the chipboard so that they are of uniform length. The stamper then releases and the conveyor advances the chipboard to its next operating position. At the next operating position air-actuated forming dies offset one end of a predetermined number of wires. A second air-actuated cutter operates in cooperation with the forming dies so as to trim the ends of all the wires to a uniform length. The chipboards are then moved by the conveyor to a position where they are automatically removed from the conveyor and deposited in a suitable receptacle.

DESCRIPTION OF THE DRAWING

The FIGURE shows a pictorial representation of the machine of this invention.

DESCRIPTION OF THE PREFERRED EMBODIMENT

In order to facilitate the automatic production of printed circuit boards and ceramic disc capacitors, wire leads are fastened across appropriate carrier strips and spaced on the carrier strips so as to be aligned for subsequent soldering to their respective terminals on the printed circuit boards or ceramic disc capacitors. Normally the printed circuit boards and ceramic capacitors remain on the carrier strips until all the manufacturing operations and testing have been completed.

The FIGURE shows the preferred embodiment of this invention whereby wire leads are automatically drawn over cardboard carrier strips, cut to uniform lengths and taped to the cardboard carrier strips. A predetermined number of the leads are subsequently offset at their ends and then the ends of all the leads are trimmed to uniform length.

The operation of the machine of the FIGURE begins at chipboard loader 10. The chipboard 11 is the preferred carrier strip of the present invention although the scope of the invention is by no means limited to this type of carrier strip and other carrier strips such as continuous tapes may also be used. Chipboard 11 is a long, thin, rectangular cardboard strip and may be of various lengths depending upon the size and numbers of printed circuits or capacitors to be soldered to the projecting lead wires. The chipboard is preferred because of its ease of handling, in that numerous chipboards may be stacked for easy movement between process stations and the chipboard is also readily adaptable for continuous automatic process.

Precut chipboards are stacked in the chipboard loader 10 for automatic insertion onto the conveyor belt 12. The bottom chipboard of the stack is automatically projected onto the left end of the conveyor by an air actuated lever which is sequentially timed so that each chipboard is automatically projected onto the conveyor as the preceding chipboard advances beyond the chipboard loader. As the chipboard is loaded onto the conveyor, holes 28 and 28' are automatically punched at each end of the chipboard. The holes 28 are caught by hooks in the conveyor which are spaced apart on the conveyor at distances substantially equal to the length of the chipboards. The hooks in the conveyor pull the chipboards along the conveyor and prevent any slipping of the chipboards as the conveyor is advanced. The conveyor advances the chipboard in sequenced movements with intervening stationary periods wherein the movement of the chipboards is temporarily stopped so as to allow automatic preprogrammed operations to be accomplished upon the chipboard.

The first operation is performed upon the chipboard when it reaches the position shown occupied by chipboard 11'. The first operation performed at this position is by the air-operated gripping jaws 14 which reach over the chipboard and grasp the ends of all the available wires, which would be 6 in this particular instance, and pull them through guide plate 20 across the chipboard as shown in the drawing. Air-actuated stamper 15 which is pivoted to swing about its lower end, is programmed so as to next press tape 16 which is fed from spool 17 onto the top of the chipboard and leads. With the stamper pressed firmly on top of the chipboard and lead wires holding them in place, the air-actuated cutter 21 is programmed to then cut all the lead wires to a uniform length. The air-actuated stamper 15 then releases and the conveyor 12 advances a discrete distance forward and the entire operation is programmed to automatically repeat itself.

The wires are fed from spools 18 that are conveniently arranged on a rack. The normal maximum wire load of the preferred embodiment would be 12 spools of wire, although the drawing only shows six wire spools. Alternate embodiments could be made with up to 20 wires on the machine. The wires are fed from the spools 18 through guides that align them and then each wire is guided through vertical and horizontal roller straighteners 19 and is passed through guide plate 20 which determines the spacing of one wire to the other. Guide plate 20 which is commonly referred to as a comb has 12 holes which are evenly spaced and which determine the maximum number of wires that the machine is capable of handling at one time. The distance between holes on the comb 20 known as the pitch distance, for the preferred embodiment would be 0.100 inch and other combs having pitch distances of 0.125 inch, 0.150 inch and 0.172 inch may be easily interchanged with comb 20 which is clamped in place and easily removed by unsecuring the clamping brackets. The wires may be threaded through the comb in any manner desired, skipping holes where necessary in order to achieve the desired pattern.

The immediate advantage of being able to change the wire configuration so easily is that the use of the machine is not limited to ceramic disc capacitor production, but may also be used as a means of aligning leads for attachment to printed circuit boards, which is a capability not possessed by other automatic wire machines because of the difficulty in changing the programmed sequence of such equipment which normally attaches one wire at a time to the carrier strips. Also as can be seen from the drawing it is not necessary to use the maximum number of allowable wires and any lesser number of wires may be threaded through comb 20.

The drawing shows an example of the versatility in which the wires may be arranged, assuming that six wires are required for a particular part such as a printed circuit board. Assume that the wires are to be threaded through a comb of modular pitch 0.100 inch. The second and third wires may be separated from each other by one pitch distance. The fourth wire is separated from the first by five pitch distances or 0.500 inch. The fifth and sixth wires are separated from the fourth by one and two pitch distances respectively as shown by the drawing.

The conveyor can be programmed to sequentially advance the chipboard two basic advance distances (1.5 inches and 2.25 inches) which may be selected by moving linkage arms on the machine. The advance distances are selected to be used with different ceramic and printed circuit board sizes. After the wires have been drawn across the chipboard, taped to the chipboard and cut, the chipboard is sequentially advanced along the conveyor to the next operating station.

In the next position the ends of the wire leads are offset by the air-actuated forming dies 22 which operate on the wire to kick the end of the wire up or down thereby forming the end of a wire so as to be in the shape of a crank as shown in the drawing. The air-actuated cutter 24 operates simultaneously with the forming dies 22 so as to trim the tips of the wires to a length which takes care of the fact that all the wires whether formed or not must have the same length when finished. Forming dies 22 are made up in sections so that any combination of wires can be formed just be programming the dies beforehand to omit or form any wire. Also there is a separate programmable die for each of the standard pitches of 0.100–0.125C—0.150 and 0.172 inch. The ends of the lead wires are offset so that when they are attached to ceramic disc capacitors or printed circuit boards, the offset leads and unformed leads fit easily over opposing surfaces of the ceramic chip or printed circuit board.

After the leads have been formed and trimmed to uniform length the conveyor is sequentially advanced to the chipboard receptacle 26 where an air-actuated lever severs the tape connecting the individual chipboards and removes the chipboard from the conveyor, whereupon the chipboard falls on top of the stacked chipboards in receptacle 26.

The machine has a great deal of flexibility and would make wires for almost any printed circuit. The operation of the machine is completely automatic and all that would be required of an operator is to supply the machine with blank chipboards and tape and wire and to remove the finished chipboards when the receptacle fills, thereby allowing one person to operate many machines at the same time. The real advantage of the invention is the speed of changeover and the almost automatic operation of the machine.

What is claimed is:

1. An automatic wire pull and tape machine comprising a conveyor programmed sequentially to advance discrete distances with intervening stationary periods, means for automatically loading individual carrier strips in sequence at the beginning of said conveyor, a predetermined number of individual wires aligned substantially near the edge of said conveyor, said wires being drawn from spools and threaded through a series of guides and straighteners and passing through a comb which establishes the distance between the ends of said wires; preprogrammed gripping jaws programmed to automatically reach over said conveyor to grasp the ends of all said wires between said jaws and pull said wires over said conveyor and carrier strip in a direction substantially perpendicular to the length of said carrier strip; a preprogrammed press programmed to automatically apply and press tape from a roll onto the top of said carrier strip and said wires during one of said intervening stationary periods and subsequent to said wires being drawn over said carrier strip, said tape fastening said wires in a substantially fixed spaced relationship to each other and to said carrier strip; a first preprogrammed cutter programmed to cut said wires to a uniform length during said one of said intervening stationary periods and subsequent to said taping operation, said cutter being actuated before said press releases; preprogrammed forming dies programmed to offset one end of a discrete number of said wires, said dies being actuated during another of said intervening stationary periods; a second preprogrammed cutter programmed to operate in cooperation with said forming dies to trim the ends of all said wires whether offset or not so as to make all said wires of substantially uniform length, means for automatically cutting said tape between said individual carrier strips, and means for removing said carrier strips and depositing said carrier strips in a receptacle when said carrier strips reach the end of said conveyor.

2. The machine of claim 1 in which said gripping jaws are air actuated, said press is air actuated, said first cutter is air actuated, said forming dies are air actuated and said second cutter is air actuated.

3. The machine of claim 1 in which said comb has 12 holes through which said wires pass with the distances between all said holes being equal, said comb being clamped in place for easy removal.

4. The machine of claim 1 in which said forming dies offset one end of a discrete number of said wires so that the offset end is in a plane other than the plane of the carrier strip while the end of said wire remains parallel to the uniform wires.

5. The machine of claim 4 in which said forming dies comprise a series of removable die sections, each section deforming the end of a single wire with no deforming of the end of said wires in those areas where sections have been removed.

* * * * *